Figure 1:
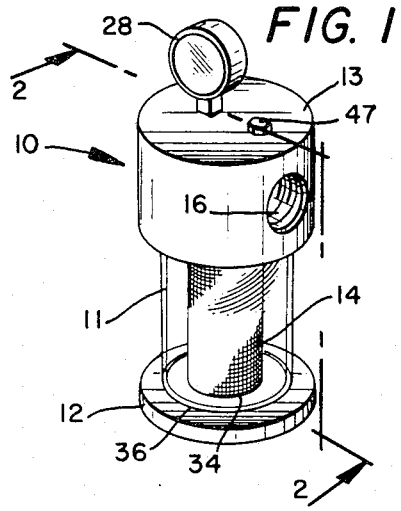

United States Patent [19]

Agerlid

[11] Patent Number: 4,544,387

[45] Date of Patent: Oct. 1, 1985

[54] OUTER TO INNER FLOW VACUUM FILTER WITH SEE THROUGH OUTER ENCLOSURE

[76] Inventor: Charles G. Agerlid, 8634 Banff Dr., Dallas, Tex. 75243

[21] Appl. No.: 694,856

[22] Filed: Jan. 25, 1985

Related U.S. Application Data

[63] Continuation-in-part of Ser. No. 534,413, Sep. 21, 1983, abandoned.

[51] Int. Cl.⁴ .................... B01D 29/04; B01D 29/16
[52] U.S. Cl. ........................................ 55/274; 55/502; 55/503; 55/509; 210/94; 210/416.1; 210/444; 210/450
[58] Field of Search .................. 55/274, 333, 502, 503, 55/507, 509; 210/94, 416.1, 440–445, 450, 446, 448, 452, 489

[56] References Cited

U.S. PATENT DOCUMENTS

| | | | |
|---|---|---|---|
| 661,373 | 11/1900 | Jandus | 210/450 |
| 864,345 | 8/1907 | Tollefson | 210/441 X |
| 946,535 | 1/1910 | Craver | 55/274 |
| 1,539,020 | 5/1925 | Papastefanou | 210/94 |
| 1,668,071 | 5/1928 | Hart | 210/94 |
| 1,693,741 | 12/1928 | Wuest | 210/448 |
| 1,981,397 | 11/1934 | Tabozzi | 210/444 X |
| 2,047,266 | 7/1936 | Hill | 210/444 X |
| 2,379,848 | 7/1945 | Damme et al. | 210/323.2 X |
| 2,448,157 | 8/1948 | Schneider | 210/416.1 X |
| 2,606,628 | 8/1952 | Hasselwander | 55/333 X |
| 2,612,270 | 9/1952 | Lewis, Jr. et al. | 210/443 X |
| 2,657,806 | 11/1953 | Launder | 210/443 |
| 2,858,026 | 10/1958 | Lorimer | 210/446 X |
| 2,894,600 | 7/1959 | Veres | 55/274 X |
| 3,000,505 | 9/1961 | Scavuzzo | 210/132 |
| 3,012,676 | 12/1961 | Englesberg | 210/94 |
| 3,040,894 | 6/1962 | Pall | 210/90 |
| 3,083,834 | 4/1963 | Pall | 210/489 X |
| 3,099,546 | 7/1963 | Smallpeice | 55/274 |
| 3,237,770 | 3/1966 | Humbert, Jr. | 210/94 |
| 3,239,062 | 3/1966 | Rosalen | 210/90 |
| 3,262,563 | 7/1966 | Pall | 210/90 |
| 3,283,902 | 11/1966 | Farris et al. | 210/90 |
| 3,295,688 | 1/1967 | Arvantikis | 210/259 |
| 3,295,689 | 1/1967 | Arvanitakis | 210/259 |
| 3,344,923 | 10/1967 | Pall et al. | 210/90 |
| 3,353,678 | 11/1967 | Dragon | 210/450 X |
| 3,368,680 | 2/1968 | Bozek | 210/90 |
| 3,695,443 | 10/1972 | Schmidt, Jr. | 210/315 |
| 3,696,933 | 10/1972 | Pall et al. | 210/444 |
| 3,830,368 | 8/1974 | Rogers | 210/94 |
| 3,855,127 | 12/1974 | Nakajima et al. | 210/90 |
| 4,057,502 | 11/1977 | Crumcrine et al. | 55/502 X |
| 4,105,561 | 8/1978 | Domnick | 210/444 X |
| 4,385,913 | 5/1983 | Lane | 55/350 |

FOREIGN PATENT DOCUMENTS

| | | | |
|---|---|---|---|
| 252829 | 3/1967 | Austria | 210/443 |
| 2601720 | 7/1977 | Fed. Rep. of Germany | 210/444 |
| 63162 | 5/1949 | Netherlands | 210/443 |
| 2046613 | 11/1980 | United Kingdom | 210/445 |

*Primary Examiner*—Robert Spitzer
*Attorney, Agent, or Firm*—Warren H. Kintzinger

[57] ABSTRACT

An in-line vacuum filter normally mounted between a vacuum pump and a vacuum packaging machine to block flow of process debris and sediment that collects at the outer surface of an outer screen of two concentric contiguous cylindrical screen with air flow inward through the two screens. The outer screen surface is viewable from the exterior of the vacuum filter through a transparent outer cylindrical enclosure so that a machine operator can easily see when it is time to disassemble and clean the filter of the sediment and debris buildup thereon. The transparent outer cylindrical enclosure and the two concentric cylindrical screens are held in the assembled vacuum filter between a bottom filter plate and a top filter plate all held together by one rod threaded on both ends with the top threaded into the top filter plate and the bottom extended through the bottom filter plate with a hex nut threaded on the bottom. "O" ring seals are mounted in annular grooves of both the bottom and top filter plates in position to seal space between groove edges and the inside of the transparent outer cylinder enclosure at opposite ends thereof when a vacuum is drawn in the filter.

18 Claims, 6 Drawing Figures

U.S. Patent Oct. 1, 1985 Sheet 1 of 2 4,544,387

OUTER TO INNER FLOW VACUUM FILTER WITH SEE THROUGH OUTER ENCLOSURE

This is a Continuation-in-Part of my co-pending application, Ser. No. 06/534,413 filed Sept. 21, 1983, now abandoned.

This invention relates in general to air flow filter devices, and more particularly, to an industrial type in-line outer to inner flow vacuum filter with a see through outer cylindrical enclosure so that a machine operator can easily see when it is time to disassemble and clean the filter of sediment and process debris buildup thereon equipped with "O" ring seals that are loose in the relaxed state facilitating repeated filter disassembly and reassembly yet subject to being drawn into the sealing state when a vacuum is drawn in the filter.

It is important to know when filter elements in an industrial type in-line air filter needs to be either service cleaned or replaced. Air vacuum filtering systems used in vacuum packaging of, for example, foods and other substances where sediment and some debris are drawn off to the air vacuum system in the vacuum pack process require good filtering be provided in protecting the system vacuum pump from damage and for efficient pumping action. This requires not only use of a good filter but also knowing by visual inspection when a filter should be disassembled and cleaned. Further, it is important that service work requirements be as convenient as possible to facilitate quick and easy efficient service cleaning of filter air filtration elements. It is important that the vacuum system pull an adequate vacuum at the vacuum pack location and not just down stream from the filter. If the filtration elements are heavily clogged with sediment silt and process debris the vacuum system is reduced to not pulling an adequate vacuum to properly vacuum pack food and other product ingredients to provide proper protection from deterioration. Further, debris and sediment passed through a filter to a vacuum pump and some through the pump can possibly contaminate the environment where sanitation considerations are quite important. Furthermore, it is also important that vacuum system filter systems be cleaned of food debris often enough that undesired spoilage and bacteria growth are kept under control and the vacuum system is up to health and safety standards at all times. With frequent filter disassembly and reassembly for filter cleaning and servicing seal wear and damage can be and in many seal structures is a serious problem.

It is therefore a principal object of this invention to provide an in-line vacuum filter wherein filtration element process debris and sediment build up is readily visible by a machine operator from the exterior of the vacuum filter.

Another object of such a filter is that it may be easily and quickly disassembled and reassembled for filtration element service cleaning or replacement whenever vacuum packing process debris and sediment build up dictate such service for continued efficient vacuum system operation.

Still another object is to provide a vacuum filter "O" ring long life seal structure facilitating repeated cycles of filter disassembly and reassembly without significant seal wear.

A further object of such a filter is to provide a clean simple design with savings not only in initial cost but also equipment operating energy costs and service maintainance requirements.

Still another object with such an in-line vacuum filter is to minimize vacuum system down time.

Features of the invention useful in accomplishing the above objects include, in an outer to inner flow in-line vacuum filter normally mounted between a vacuum pump and a vacuum packaging machine, collection of vacuum packaging process debris and sediment where it can be seen through a transparent outer cylindrical enclosure at the outer surface of an outer cylindrical screen of two concentric contiguous cylindrical screens with air flow inward through the two screens. The transparent outer cylindrical enclosure and the two concentric cylindrical screens are held in the assembled vacuum filter between a bottom filter plate and a top filter plate all held together by one rod threaded on both ends with the top threaded into the top filter plate and the bottom extended through the bottom filter plate with a hex nut threaded on the bottom end. In the drawing of a vacuum for a vacuum packaging machine air is drawn in through an inlet opening in the top filter plate and passed to an annular vacuum filter chamber between the transparent outer cylindrical enclosure and the outer cylindrical screen that is a relatively fine mesh screen supported by the inner screen that is a structural support screen having larger staggered openings therein. The air is further drawn through the filter elements from the annular vacuum filter chamber to a cylindrical inner filter chamber and therefrom up and out through an outlet fitted opening in the top filter plate to the vacuum pump protected by the filter. A vacuum gauge mounted on the top filter plate with air passage means to the cylindrical inner filter chamber that, when indicating a greater drawing of vacuum than usual indicates further undesired excessive process debris and sediment clogging of the outer filter element. "O" ring seals are mounted in annular grooves of both the bottom and top filter plates in position to seal against opposite ends of the inside of the transparent outer cylindrical enclosure when a vacuum is drawn in the filter. "O" ring seals are also used in mounting of the filter screens.

A specific embodiment representing what is presently regarded as the best mode of carrying out the invention is illustrated in the accompanying drawings:

IN THE DRAWINGS

Figure 3:
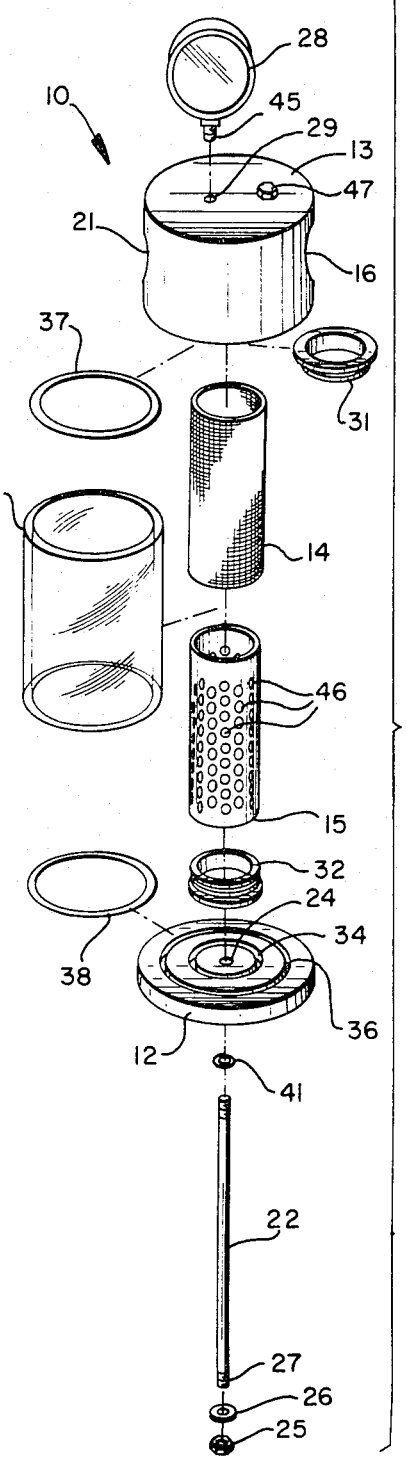
Figure 2:
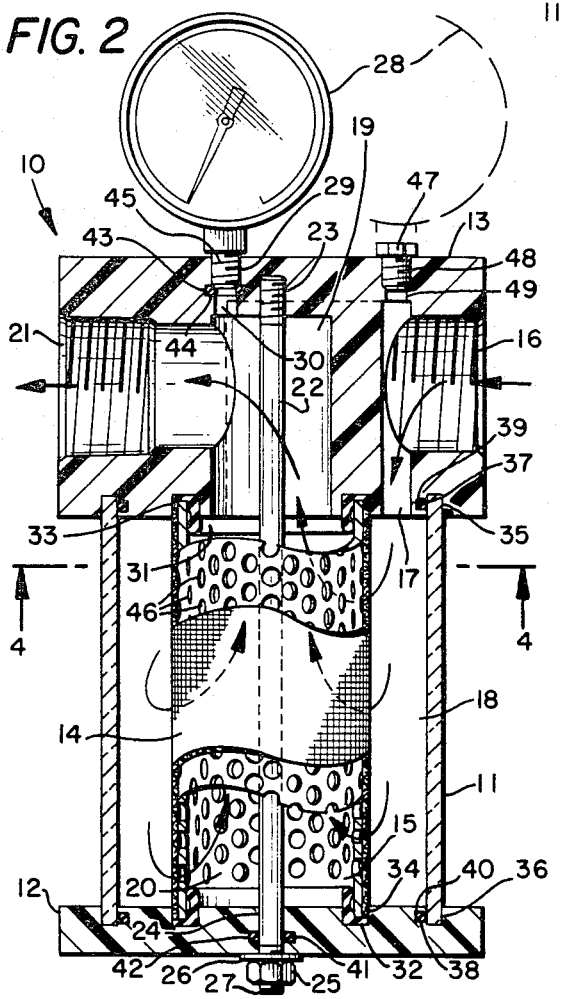
Figure 4:
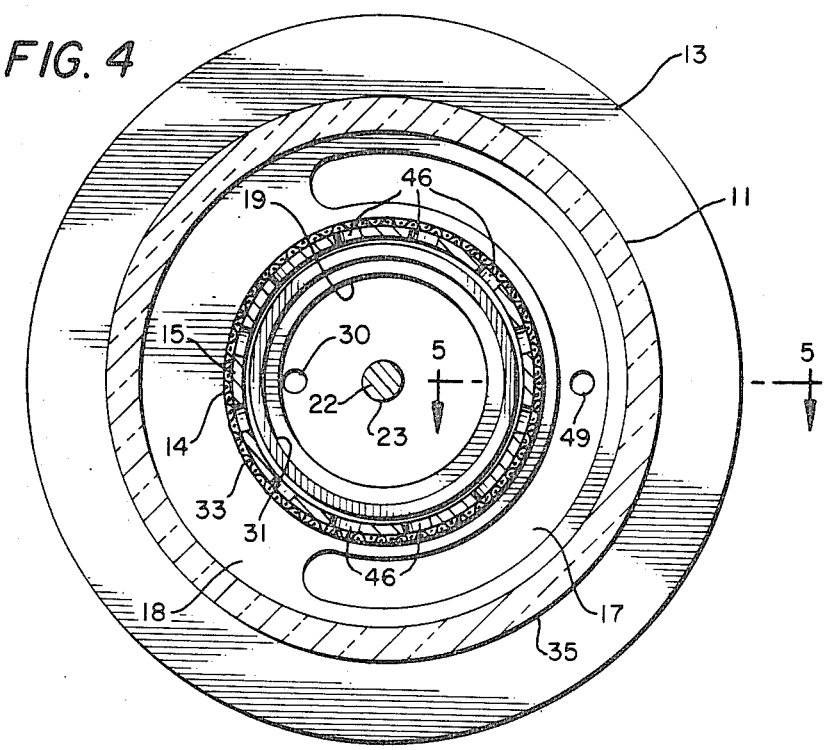
Figure 5:
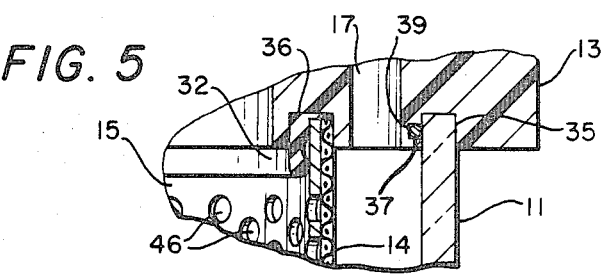
Figure 6:
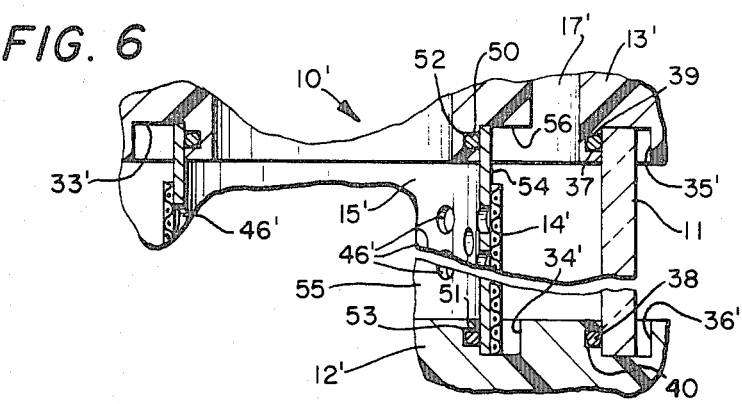

FIG. 1 represents a perspective view of the outer filter chamber to inner chamber air flow vacuum filter with a see through outer enclosure;

FIG. 2, a partially cut away and sectioned view taken generally along line 2—2 of FIG. 1 showing internal detail of the vacuum filter;

FIG. 3, an exploded disassembled perspective view of the vacuum filter;

FIG. 4, is a cut away and sectioned view taken along line 4—4 of FIG. 2 looking upward and showing bottom detail of the vacuum filter top plate;

FIG. 5, a partial cut away and sectioned view taken generally along line 5—5 of FIG. 4 showing air inlet passage to filter outer chamber detail; and FIG. 6, a partial cut away and sectioned view like FIG. 5 showing screen and "O" ring mounting detail.

REFERRING TO THE DRAWINGS

The vacuum filter 10 of FIGS. 1 and 2 is shown to have a see through outer cylindrical enclosure member 11 held between a bottom filter plate 12 and a top filter plate 13 also holding therebetween concentric contiguous outer and inner cylindrical filter screens 14 and 15. The top filter plate 13 has a threaded air inlet opening 16, that is connectable to a vacuum pack machine through an air line (not shown), and an arcuate passage 17 therefrom to outer annular filter chamber 18 between the transparent outer cylindrical enclosure member 11 and the outer surface of the outer cylindrical filter screen 14. Top filter plate 13 also has a center air chamber 19, that is an upper extension of the inner cylindrical filter chamber 20 within inner cylindrical filter screen 15, and therefrom a threaded air outlet opening 21 that is connectable to a vacuum pump through a vacuum line (not shown). The outer cylindrical enclosure member 11 and the outer and inner filter screens 14 and 15 are held between the bottom filter plate 12 and the top filter plate 13 by a single rod 22 threaded into threaded opening 23 in top filter plate 13 with the rod bottom extended through opening 24 in bottom filter plate 12 and with a hex nut 25 and washer 26 on the rod threaded end 27. Vacuum gauge 28 is threaded into opening 29 in top filter plate 13 with opening 30 providing gaseous fluid communication with center vacuum chamber 19 that is an extension of filter chamber 20.

The upper end of contiguous outer and inner cylindrical filter screens 14 and 15 and the lower end thereof together with gaskets 31 and 32 are received, respectively, in annular grooves 33 and 34 in the top plate 13 and the bottom plate 12 to help keep sediment out of inner vacuum chamber. The top of transparent cylindrical enclosure member 11, that is made of clear plexiglass tubing, is received in top plate annular groove 35, and the bottom of enclosure member 11 is received in bottom plate annular groove 36. "O" rings 37 and 38 are retained in inner rectangular in cross section annular grooves 39 and 40, respectively, in the inner cylindrical walls of grooves 35 and 36 seal the top and bottom of enclosure member 11 to the top plate 13 and bottom plate 12 against outside to vacuum filter air leakage. It is important that the "O" rings 37 and 38 be generally loose sliding fits against the inner cylindrical surface of the enclosure member 11 at the top and bottom thereof to permit frequent, perhaps daily, disassembly of the filter for cleaning of process debris and sediment from the filter screen sub assembly of screens 14 and 15. The loose "O" rings 37 and 38 allow such frequent disassembly and reassembly without material wear and yet when a vacuum is drawn within the assembled filter structures the "O" rings 37 and 38 are drawn up tight to seal the spacing tolerance between the inner edge of the grooves 39 and 40 and the inner cylindrical surface of the transparent enclosure member 11 from leakage flow of air from the outside to the inside of the vacuum filter 10. An "O" ring seal 41 is retained in annular "O" ring groove 42 in bottom plate 12 to seal rod 22 in bottom plate opening 24, and a similar "O" ring seal 43 is retained in annular "O" ring groove 44 in top plate 13 to seal the threaded stem 45 of vacuum gauge 28 in top plate opening 29 from leakage of outside air to the vacuum system.

The inner cylindrical filter screen 15 is a structural support element supporting the outer cylindrical filter screen 14 that is in the form, for example, of wire cloth of 304 SS (stainless steel), 40 mesh, 0.010 diameter wire. The inner screen 15 has staggered relatively large holes 46 with, typically, inner screen 15 specification 14 gauge 304 SS (stainless steel) $\frac{1}{4}$" staggered, 0.250" diameter holes 5/16" CTR (center spacing) 58 percent open.

Thus, the inner screen provides the structural support for the outer screen that does substantially all the system filtering without the inner screen materially impeding air flow through the filter screen assembly as induced by system vacuum pump suction. Further, when it becomes apparent that screen 14 should be cleaned of sediment and process debris buildup thereon either visually through the see through outer cylindrical enclosure member 11 and/or by excessive vacuum indication on vacuum gauge 28 in the machine operator may easily and quickly remove hex nut 25 and the bottom plate 12 along with transparent enclosure member 11 and the inner and outer screen 15 and 14 sub-assembly for quick wash flushing of process debris and sediment off and away from the outer surface of the screen 15 and 14 sub-assembly. It may be of interest to note that the lower and upper plates 12 and 13 both may be made of high density polyethylene for long service life, sanitation and non-contamination reasons, enhanced ease of service and savings in cost.

It should be noted that a plug 47 is threaded into opening 48 in top plate 13 to close the opening 49 therefrom to chamber 18. Should it be desired to reposition vacuum gauge 28 threading it into opening 48 plug 47 is repositioned, threaded into opening 29 to close the opening 30. With the vacuum gauge 28 so positioned a reading of the pressure in outer filter chamber 18 will be provided and will give an indication when screen 14 should be cleaned of sediment and process debris buildup thereon in addition to a visual indication by lessening of vacuum draw indication on the gauge 28.

With reference to the embodiment modifications of FIG. 6 the structural inner cylindrical filter screen 15' has an upper end received in groove 33' in the top plate 13' and a lower end received in groove 34' in the bottom plate 12'. "O" rings 50 and 51 are retained in radially inner, rectangular in cross section, annular grooves 52 and 53, respectively, in the inner cylindrical walls of grooves 33' and 34' to provide alignment support for the respective ends of the structural inner cylindrical filter screen 15'. The "O" rings 50 and 51 while providing such support are so relaxed and flexible in their mountings as to accommodate frequent disassembly and reassembly of the filter for cleaning of the screens and maintainance without material destructive wear of the "O" rings 50 and 51. Further, the staggered relatively large holes 46' in the inner screen 15' extends through a definitive length thereof between top and bottom end portions 54 and 55 thereof that are cylindrical end sections without holes. The outer cylindrical filter screen 14' that is supported by inner cylindrical filter screen 15' is a sliding fit thereon for ease of removal therefrom and replacement thereon for cleaning maintainance and spans such vertical length of the inner cylindrical filter screen 15' as to overlie the entire area of staggered relatively large holes 46' even with the outer screen 14' shorter than the inner screen 15' as shown in FIG. 6. Outer screen 14' being shorter than inner screen 15' is a protection for the outer screen 14' from damage with repeated disassembly and reassembly of the filter 10'. Another advantageous feature of the filter 10' embodiment is that grooves 33' and 34' in top plate 13' and bottom plate 12' are enlarged grooves wider than the combined thickness of outer screen 14' and inner screen 15'. This affords additional protection for the outer screen 14' in that there would never be compressive end pressures imposed thereon particularly with the "O" ring 50 and 51 guided positioning of inner screen 15' upon assembly thereof into the grooves 33' and 34' of the top and bottom plates 13' and 12' respectively. It should be noted that through the arcuate length of arcuate passage 17' in top plate 13' the bottom 56 of groove 33' extends across to passage 17' rather than having a relatively thin wall therebetween. As a further aid facilitating assembly and disassembly of the filter 10' the grooves 35' and 36' of top and bottom plates 13' and 12' are of material greater width than the wall thickness of see through member 11. Grooves 35', 36', 33' and 34' being extra width grooves also is an aid to manufacture of filter top and bottom plates 13' and 12' with production of "O" ring grooves made easier.

Many of the vacuum filters found on the market simply do not present the advantageous combination of features inherent in applicants vacuum filter such as a transparent enclosure so that a machine operator can easily see when process debris and sediment buildup is such as to make filter cleaning or replacement advisable for continued efficient vacuum filtering and proper system operation. Further, easy, quick disassembly, cleaning and reassemble of the vacuum filter as facilitated by an "O" ring structure in both the bottom and top plates that are relatively loose except when drawn into the sealing state as a vacuum is drawn combined with the visual ability to see debris and sediment buildup in a vacuum filter did not appear in patent art located in a patentability search.

Whereas this invention has been described with respect to several embodiments thereof, it should be realized that various changes may be made without departure from the essential contributions to the art made by the teachings hereof.

I claim:

1. An in-line vacuum filter useable in a vacuum system between a vacuum pump and a vacuum packaging machine to block flow of process debris and sediment to the vacuum pump comprising: filter element means; an outer enclosure; with said outer enclosure and said filter element means defining an outer chamber; filter plate means closing an end of said outer chamber; air inlet and passage means in said filter plate means in fluid communication with said outer chamber whereby vacuum system air is drawn through said air inlet means and through said passage means into said outer chamber; an inner space chamber defined by said filter element means and with said filter plate means closing an end of said inner space chamber; vacuum air outlet and passage means in said filter plate means in fluid communication with said inner chamber whereby vacuum system air is sucked from said inner space chamber when the vacuum pump of the system is drawing a vacuum; and with said outer enclosure including transparent material wall means whereby an operator may visually see process debris and sediment buildup on the outer surface of said filter means; wherein said outer enclosure means is in the form of a transparent material cylindrical tube; with said filter plate means including a first filter plate and a second filter plate closing opposite ends of said transparent material cylindrical tube; structural means holding said first and second filter plates, said outer enclosure means, and said filter element means in assembled relation as a vacuum filter; said first filter plate includes said air inlet and passage means and also said vacuum air outlet and passage means; wherein said filter element means is in the form of a cylindrical tube of air passing filter material with opposite ends closed by said first and second filter plates; said first filter plate and said second filter plate are provided with facing planar surfaces with concentric annular grooves for mounting of said outer enclosure means, and said filter element means assembled in concentric relation about said structural means as a vacuum filter; and wherein ends of said filter element means are received in annular grooves in said first and second filter plates of less diameter than said annular grooves receiving ends of said outer enclosure; and seal means in the form of "O" ring seals seal the interconnect of the ends of said outer enclosure with said first and second filter plates from the bypass drawing of outside air into the vacuum filter; with the "O" ring seals mounted in annular branch grooves in the inner walls of said annular grooves mounting said outer enclosure means with said "O" ring seals in position to seal space between branch groove edges and the inside of the transparent outer cylindrical enclosure at opposite ends thereof when a vacuum is drawn in the filter; and with said "O" ring seals relatively loose in the relaxed state facilitating repeated filter disassembly and reassembly yet subject to being drawn into the sealing state when a vacuum is drawn in the filter.

2. The in-line vacuum filter of claim 1, wherein said structural means is in the form of a rod interconnecting said first and second filter plates.

3. The in-line vacuum filter of claim 2, wherein said rod is threaded into said first filter plate and passed through said second filter plate where a nut is threaded on a threaded end of said rod to, with said rod, hold said first and second filter plates, said outer enclosure means, and said filter element means in assembled relation as a vacuum filter.

4. The in-line vacuum filter of claim 1, wherein filter end seal means in the form of annular seal boots cushion seat ends of said filter element means in annular grooves of said first and second filter plates.

5. The in-line vacuum filter of claim 4, wherein said filter element means is two cylindrical concentric filter elements with the first element a fine mesh screen filter outer element; and the second element a structural support filter inner element having larger through air flow openings therein than the openings in said fine mesh screen filter outer element.

6. The in-line vacuum filter of claim 5, wherein said first filter plate is a top filter plate; and said second filter plate is a bottom filter plate.

7. The in-line vacuum filter of claim 6, wherein a vacuum gauge is mounted on said first filter plate with additional passage means providing fluid communication from the interior of said vacuum gauge to said passage means in said filter plate means in fluid communication with a chamber of the filter.

8. The in-line vacuum filter of claim 5, wherein said two cylindrical concentric filter elements are made from stainless steel with said first fine mesh screen filter outer element being of fine mesh stainless steel wire cloth supported on said structural support filter inner element.

9. The in-line vacuum filter of claim 1, wherein said first filter plate and said second filter plate are both made of high density polyethylene for long service life and sanitation non-contamination.

10. The in-line vacuum filter of claim 1, wherein said filter element means is two cylindrical concentric filter elements with the first element a fine mesh screen filter element; and the second element a structural support filter inner element having larger through air flow openings therein than the openings in said fine mesh screen filter outer element.

11. The in-line vacuum filter of claim 10, wherein said two cylindrical concentric filter elements are made from stainless steel with said first fine mesh screen filter element being of fine mesh stainless steel wire cloth supported on said structural support filter inner element.

12. The in-line vacuum of claim 1, wherein "O" ring seals are also mounted in annular branch grooves in the inner walls of annular grooves in said first and second filter plates receiving ends of said filter element means as said filter element end seal means.

13. The in-line vacuum filter of claim 12, wherein said filter element means is two cylindrical concentric filter elements with the first element a fine mesh screen filter outer element; and the second element a structural support filter inner element having larger through air flow openings therein than the openings in said fine mesh screen filter outer element.

14. The in-line vacuum filter of claim 13, wherein said fine screen filter outer element is a sliding fit on said structural support filter inner element.

15. The in-line vacuum filter of claim 14, wherein said through air flow openings in said structural support filter inner element are staggered relatively large holes in aid structural support filter inner element extending through an area of definitive length between top and bottom end portions thereof that are cylindrical without holes.

16. The in-line vacuum filter of claim 15, wherein said fine screen filter outer element is shorter than the top to bottom length of said structural support filter inner element, and yet sufficiently long to overlie the entire area of staggered relatively large hole area even with said fine screen filter outer element slid to its upper or lower limit positions on said structural support filter inner element.

17. The in-line vacuum filter of claim 16, wherein the annular grooves in said first and second filter plates receiving ends of said filter element means are wider than the width thickness of said fine screen filter outer element and said structural support filter inner element assembled together.

18. The in-line vacuum filter of claim 17, wherein the annular grooves in said first and second filter plates receiving ends of said outer enclosure are greater in width than the width of wall thickness of said see through outer enclosure means.

* * * * *